United States Patent
Li et al.

(10) Patent No.: US 9,902,860 B1
(45) Date of Patent: Feb. 27, 2018

(54) PHOTOPOLYMER COMPOSITION FOR 3D PRINTING

(71) Applicant: Nano and Advanced Materials Institute Limited, Hong Kong (CN)

(72) Inventors: Jifan Li, Hong Kong (CN); Wai Yan Chan, Hong Kong (CN); Ka Kit Yee, Hong Kong (CN); Ka Leung Kevin Cheuk, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 0 days.

(21) Appl. No.: 15/252,182

(22) Filed: Aug. 30, 2016

(51) Int. Cl.
*C08F 2/48* (2006.01)
*C08F 2/50* (2006.01)
*C08G 61/04* (2006.01)
*C09D 4/00* (2006.01)
*C09D 11/101* (2014.01)

(52) U.S. Cl.
CPC ............ *C09D 4/00* (2013.01); *C09D 11/101* (2013.01)

(58) Field of Classification Search
USPC .......... 522/9, 8, 7, 6, 1, 71, 189, 184; 520/1
See application file for complete search history.

(56) References Cited

U.S. PATENT DOCUMENTS

| | | | |
|---|---|---|---|
| 7,225,045 B2 | 5/2007 | Gothait et al. | |
| 8,182,882 B2 | 5/2012 | Johnson et al. | |
| 2003/0092820 A1* | 5/2003 | Schmidt | C09D 11/101 524/487 |
| 2004/0242728 A1* | 12/2004 | Xu | B29C 67/0059 523/160 |
| 2005/0104241 A1 | 5/2005 | Kritchman et al. | |
| 2011/0045199 A1* | 2/2011 | Cong | C08F 2/48 427/487 |
| 2012/0157561 A1* | 6/2012 | Gould | B41J 11/002 522/16 |
| 2013/0188270 A1 | 7/2013 | Nishimae et al. | |
| 2014/0107823 A1 | 4/2014 | Huang | |

FOREIGN PATENT DOCUMENTS

WO WO2014/178834 11/2014

OTHER PUBLICATIONS

Dursun, C., Degirmenci, M., Yagci, Y., Jockusch, S. and Turro, N.J., "Free radical promoted cationic polymerization by using bisacylphosphine oxide photoinitiators: substituent effect on the reactivity of phosphinoyl radicals", Polymer (2003), 44: 7389-7396.
Fouassier, J.P. and Lalevée, J., "Photochemical Production of Interpenetrating Polymer Networks; Simultaneous Initiation of Radical and Cationic Polymerization Reactions", Polymers (2014), 6: 2588-2610.

* cited by examiner

*Primary Examiner* — Jessica Whiteley
(74) *Attorney, Agent, or Firm* — Eagle IP Limited; Jacqueline C. Lui

(57) ABSTRACT

The present invention provides photopolymer compositions for 3D printing which have low viscosity, proper curing rate, low volume shrinkage, and low ash content. Such compositions may be used in 3D printing for direct investment casting of products and rapid prototyping.

19 Claims, No Drawings

PHOTOPOLYMER COMPOSITION FOR 3D PRINTING

FIELD OF THE INVENTION

The present invention relates to photopolymer compositions used for three-dimensional (3D) printing.

BACKGROUND 3D printing is an additive manufacturing process, as opposed to a subtractive manufacturing process which involves milling or cutting of pieces in order to build a designed shape. In 3D printing process, a material is added in successive layers until it forms a shape of a desired product.

In 3D printing, hundreds or thousands of layers of material are "printed" layer upon layer using various materials, most of which are commonly plastic polymers or metals. Generally, the printing technologies are material dependent. For instance, photopolymer liquids are used in jetted 3D printer, acrylonitrile butadiene styrene (ABS) material is used in fusion deposition modeling (FDM) printer, and metals are used in laser sintering.

Among these 3D printing technologies, light polymerized technologies, such as stereolithography (SLA) and digital light processing (DLP) have incomparable advantages over FDM, such as higher resolution, better mechanical strength, and smoother surface.

In view of the demand for SLA/DLP technologies, polymer compositions with improved performance are desired.

SUMMARY OF THE INVENTION

One example embodiment is a photopolymer composition for 3D printing, comprising: at least one epoxy monomer; at least one polyfunctional (meth)acrylate monomer; at least one space-filling monomer; at least one a photo-initiator; at least one cationic initiator; at least one co-initiator; and at least one light stabilizer.

In a further example embodiment, the epoxy monomer is selected from a group consisting of 3,4-epoxycyclohexanecarboxylate, bisphenol A diglycidyl ether, trimethylolpropane triglycidyl ether, and pentaerythritol glycidyl ether.

In another further example embodiment, the polyfunctional (meth)acrylate monomer is UV/visible curable, and selected from a group consisting of ethylene glycol dimethacrylate, diethylene glycol dimethacrylate, 1,6-hexanediol dimethacyrlate, trimethyolpropane trimethacrylate, trimethyolpropane triacrylate, ethoxylated trimethyol propane trimethacrylate, ethyoxylated pentaerythritol tetramethacrylate, ethoxylated trimethylolpropane triacrylate, and pentaerythritol tetraacrylate.

In a further example, the space-filling monomer is space-filling (meth)acrylate monomer and comprises at least one rigid, bulky functional group which is selected from a group consisting of bisphenol-A moiety, isobornyl moiety, cyclohexyl moiety and phenyl moiety. In one embodiment, the space-filling monomer is selected from a group consisting of 2,2 bis[4-(methacryloxy ethoxy)phenyl]propane, isobornyl methacrylate, isobornyl acrylate, 2-phenoxyethylacrylate, and 3,3,5-trimethylcyclohexyl methacrylate.

In a further example embodiment, the cationic initiator generates the cation radicals to initiate ring-opening polymerization, and is selected from a group consisting of bis(4-t-butylphenyl)iodonium hexafluorophosphate, and bis(4-methylphenyl)iodonium hexafluorophosphate.

In a further example embodiment, the photo-initiator generates free radicals by UV/Visible light to initiate polymerization, and is selected from a group consisting of bis(2,4,6-trimethyl benzoyl)phenyl phosphine oxide and 2,4,6-trimethylbenzoyl diphenyl phosphine.

In a further example embodiment, the co-initiator is N-vinylcarbazole which accelerates the ring-opening polymerization.

In a further example embodiment, the light stabilizer is used to control cure depth in 3D printed products and prevent photodegradation, and is selected from a group consisting of Sudan dyes, 2-(2'-hydroxy-3',5'-di-tert-butyl-phenyl)-5-chlorobenzortriazole, 2-(2'-Hydroxy-3'-tert-butyl-5'-methylphenyl)-5-chlorobenzortriazole, 2,2'-(2,5-thiophenediyl)bis(5-tert-butylbenzoxazole) and (2,5-bis(5-tert-butyl-benzoxazol-2-yl)thiophene.

In one example embodiment, the photopolymer composition comprises 30-50 wt % epoxy monomer, 5-25 wt % polyfunctional (meth)acrylate monomer, 30-50 wt % space-filling monomer, 0.5-2 wt % photo-initiator, 0.5-2 wt % cationic initiator, 0.5-2 wt % co-initiator, and 0.01-2 wt % light stabilizer. In a further example, the photopolymer composition comprises 40.84 wt % pentaerythritol glycidyl ether, 14.90 wt % trimethyolpropane trimethacrylate, 40.84 wt % 2-phenoxyethylacrylate, 0.74 wt % 2,4,6-trimethylbenzoyl diphenyl phosphine, 0.88 wt % bis(4-methylphenyl)iodonium hexafluorophosphate, 1.33 wt % N-vinylcarbazole, and 0.47 wt % Sudan I dye.

In one example embodiment, the photopolymer composition comprises 75-95 wt % epoxy monomer, 0.1-15 wt % polyfunctional (meth)acrylate monomer, 0.1-10 wt % space-filling monomer, 0.5-2 wt % photo-initiator, 0.5-2 wt % cationic initiator, 1-5 wt % co-initiator, and 0.01-2 wt % light stabilizer. In a further example, the photopolymer composition comprises 91.90 wt % pentaerythritol glycidyl ether, 1.00 wt % trimethyolpropane trimethacrylate, 1.00 wt % 2-phenoxyethylacrylate, 0.99 wt % 2,4,6-trimethylbenzoyl diphenyl phosphine, 1.98 wt % bis(4-methylphenyl)iodonium hexafluorophosphate, 3.10 wt % N-vinylcarbazole, and 0.03 wt % Sudan I dye.

Another example embodiment is a photopolymer composition for 3D printing comprising: at least one polyfunctional (meth)acrylate monomer; at least one space-filling monomer or organic compounds; at least one (meth)acrylate monomer; at least one photo-initiator; and at least one light stabilizer.

In a further example embodiment, the polyfunctional (meth)acrylate monomer is UV/visible curable, and is selected from a group consisting of ethylene glycol dimethacrylate, diethylene glycol dimethacrylate, 1,6-hexanediol dimethacyrlate, trimethyolpropane trimethacrylate, trimethyolpropane triacrylate, ethoxylated trimethyol propane trimethacrylate, ethyoxylated pentaerythritol tetramethacrylate, pentaerythritol tetramethacrylate, ethoxylated trimethylolpropane triacrylate, and pentaerythritol tetraacrylate.

In a further example embodiment, the space-filling monomer or organic compounds has low melting point and comprises one functional group selected from a group consisting of polyoxyethylene (40) stearate, 1-hexadecanol, 1-pentadecanol, 1-octadecanol, 1-tetradecanol, bisphenol A glycerolate di methacrylate, stearyl methacrylate and octadecyl acrylate.

In a further example embodiment, the (meth)acrylate monomer serves to adjust viscosity and increase the solubility of space-filling monomer, and is selected from a group consisting of isobornyl acrylate, 2-hydroxyethyl acrylate, 4-hydroxybutyl acrylate, 2-hydroxybutyl acrylate, and 2-hydroxyethyl methacrylate.

In a further example embodiment, the photo-initiator generates radicals by UV/Visible light to initiate polymerization, and is selected from a group consisting of bis(2,4, 6-trimethyl benzoyl)phenyl phosphine oxide (BAPO) and 2,4,6-trimethylbenzoyl diphenyl phosphine (TPO).

In a further example embodiment, the light stabilizer is used to control cure depth of 3D printed products and prevent photodegradation, and is selected from a group consisting of Sudan dyes, 2-(2'-hydroxy-3',5'-di-tert-butylphenyl)-5-chlorobenzortriazole, 2-(2'-hydroxy-3'-tert-butyl-5'-methylphenyl)-5-chlorobenzortriazole, 2,2'-(2,5-thiophenediyl)bis(5-tert-butylbenzoxazole) and (2,5-bis(5-tert-butyl-benzoxazol-2-yl)thiophene.

In one example embodiment, the photopolymer composition comprises 10-40 wt % polyfunctional (meth)acrylate monomer, 30-50 wt % space-filling monomer or organic compounds, 15-35 wt % (methy)acrylate monomer, 0.5-5 wt % photo-initiator, and 0.01-1 wt % light stabilizer. In a further example, the photopolymer composition comprises 36.29 wt % pentaerythritol tetramethacrylate, 30.92 wt % stearyl methacrylate, 30.92 wt % 2-hydroxybutyl acrylate, 1.84 wt % 2,4,6-trimethylbenzoyl diphenyl phosphine, and 0.03 wt % Sudan I dye.

In one example embodiment, the photopolymer composition comprises 20-40 wt % polyfunctional (meth)acrylate monomer, 20-40 wt % space-filling monomer or organic compounds, 20-40 wt % (methy)acrylate monomer, 0.5-5 wt % photo-intiator, and 0.01-1 wt % light stabilizer. In a further example, the photopolymer composition comprises 33.09 wt % trimethyolpropane trimethacrylate, 33.09 wt % stearyl methacrylate, 33.09 wt % isobornyl acrylate, 0.57 wt % 2,4,6-trimethylbenzoyl diphenyl phosphine, and 0.16 wt % 2,2'-(2,5-thiophenediyl)bis(5-tert-butylbenzoxazole).

DETAILED DESCRIPTION

In particular, the present invention relates to photopolymer compositions which have low viscosity, proper curing rate, low volume shrinkage, and low ash content. Such compositions may be used in 3D printing for direct investment casting of products and rapid prototyping.

The photopolymer used in SLA/DLP process is the key to the successes of the printed prototype. However, the current photopolymer suffers problems like shrinkage occurring upon solidification which results in warpage or curling phenomena. In addition, the thermal-mechanical properties thereof are poor during burnout cycles. The amount of ash is higher than expected at relatively lower burnout temperature. The incomplete burnout process causes residual ash to remain in the mold and leads to poor surface properties.

Therefore, there is a need to provide an advanced photopolymer composition which offers improved burn out properties with a minimal amount of ash residue for investment casting.

The volume shrinkage is also one of the well-known deficiencies of photopolymerization materials. When the inherent polymerization shrinkage strain is frustrated by sufficient interfacial adhesion between the polymer and base substrate, stress is conveyed to the substrate. If the stress exceeds the adhesive strength of any component of the system, the micro- or macro-defect can emerge. The bulk volume shrinkage in photopolymerization is an unavoidable result of the formation of new covalent bonds via the van der Waals force.

Although numerous of methods have been reported to reduce the polymerization volume shrinkage, there remains a need to develop an advanced photopolymer composition that has lower volume shrinkage rate.

Researches have been carried out to reduce the polymerization volume shrinkage, which could be divided into three types: changing the monomer structure or chemical structure, adding fillers or additives, and changing process conditions. The chemical method is a convenient way to reduce the shrinkage rate. It is proved that free radical/cationic hybrid system, such as (meth)acrylate/epoxy, is efficient to decrease the volume shrinkage due to the two polymer network formation, especial for those flexible structure containing system.

The other way to reduce shrinkage rate of composite resin is changing the monomer structure. By introducing space-filling monomer to the composite resin, the volume shrinkage can be minimized. Bisphenol A-glycidyl methacrylate (Bis-GMA) is an especially important monomer in 3D printing industry because of its unique properties such as low-shrink and high stiffness. However, the high viscosity of Bis-GMA resulted in slow polymerization rate and further limited its applications. It is therefore typically diluted with a less viscous acrylate or methacrylate monomer, such as TEGDMA, or tetraethylene glycol dimethacrylate. However, such low molecular weight monomers contribute to increased shrinkage. Bulky acrylate monomers such as isobornyl acrylate (IBOA) and isobornyl methacrylate (IBOMA) are two acrylate monomers with low viscosity and shrinkage values. IBOA and IBOMA were used as diluents to replace in the Bis-GMA/TEGDMA system because of their low polymerization shrinkage.

An example embodiment includes a high performance photopolymer for 3D printing. These developed photopolymer have low volume shrinkage, and low burnout ash content. A hybrid network based on acrylate, epoxy was developed using free radical/cationic hybrid system in order to reduce the volume shrinkage. Space-filling monomers are introduced into the photopolymer composites in order to reduce the volume shrinkage. To minimize the burnout ash content, low melting point space-filling monomer was added into the composition.

High Performance Photopolymer with Low Volume Shrinkage

One object of an example embodiment relates to photo-curable polymer compositions used to produce low volume shrinkage 3D-printed product. By "low shrinking" it means a material having volume shrinkage of less than about 5%. In one example embodiment, a low volume shrinkage photopolymer composition is prepared from a photo-curable mixture that includes (i) at least one UV/visible curable polyfunctional (meth)acrylate monomer; (ii) at least one epoxy monomer; (iii) at least one space-filling (meth)acrylate monomer; (iv) at least one photo-initiator; (v) at least one cationic initiator; (vi) at least one co-initiator, and (vii) at least one light stabilizer.

In one example embodiment, a photo-curable liquid low volume shrinkage photopolymer composition includes any type of polyfunctional (meth)acrylates monomer having two or more functionalities. The polyfunctional monomer serves to enhance the curing rate, adjust viscosity, and improve toughness of the 3D-printed product.

In one example embodiment, a photo-curable liquid low volume shrinkage photopolymer composition includes any type of epoxy monomer. The polymerization of epoxy monomer serves to reduce the volume shrinkage of the 3D-printed product due to the ring opening volume expansion.

In one example embodiment, a photo-curable liquid low volume shrinkage photopolymer composition includes space-filling (meth)acrylate monomer having space-filling bulky functional group(s) to provide low volume shrinkage composition. The space-filling monomer of an example embodiment is a monomer that contains a rigid, bulky functional group that can miscible into composites, which exhibit low volumetric shrinkage during polymerization.

In one example embodiment, a photo-curable liquid low volume shrinkage photopolymer composition includes a photo-initiator which functions to generate radicals by UV/Visible light to initiate polymerization.

In one example embodiment, a photo-curable liquid low volume shrinkage photopolymer composition includes a co-initiator which functions to accelerate the ring-opening polymerization. Representative example of co-intiator is N-vinylcarbazole. This compound can undergo addition process to hardly oxidizable radicals. The resultant radicals can be easily oxidized by a cationic initiator and thereby accelerating the ring opening polymerization of epoxides.

In one example embodiment, a photo-curable liquid low volume shrinkage photopolymer composition includes a cationic initiator which functions to generate cation by radical to initiate ring-opening polymerization.

In one example embodiment, a photo-curable liquid low volume shrinkage photopolymer composition includes one or more light absorber. The functions of light absorbers include control of cure depth in an attempt to improve accuracy of 3D-printed parts and prevent photodegradation. High Performance Photopolymer with Low Ash Content Another object of an example embodiment is to provide photo-curable compositions used to produce low ash 3D-printed object. By "low ash" it is meant a material having ash content at 600° C. of less than 0.1%. In one example embodiment, a low ash photopolymer composition is prepared from a photo-curable viscous mixture that includes (i) at least one UV/visible curable polyfunctional (meth)acrylate monomer; (ii) at least one space-filling monomer or organic compounds; (iii) at least one (meth) acrylate monomer; (iv) at least one photo-initiator; and (v) at least one light stabilizer.

In one example embodiment, a photo-curable liquid low ash photopolymer composition includes any type of polyfunctional (meth)acrylates monomer having two or more functionalities used for preparation of a 3D-printed products. The polyfunctional monomer serves to enhance the curing rate, adjust viscosity, and improve toughness of the 3D-printed product.

In one example embodiment, a photo-curable liquid low ash photopolymer composition includes space-filling monomer or organic compounds. The space-filling monomer is a low melting point organic compound that can be fully dissolved in the monomer solution. During the burn out cycle, the space-filling monomer melts away first allowing the polymer to burn off without excessive expansion or pressure from degassing which is a problem normally associated with polymer based materials during the burn out cycle.

In one example embodiment, a photo-curable liquid low ash photopolymer composition includes (meth)acrylate monomer serve to adjust viscosity and increase the solubility of space-filling monomer.

In one example embodiment, a photo-curable liquid low ash photopolymer composition includes a photo-initiator which functions to generate radicals by UV/Visible light to initiate polymerization.

In one example embodiment, a photo-curable liquid low ash photopolymer composition includes one or more light absorber. The functions of light absorbers include control of cure depth in an attempt to improve accuracy of 3D-printed product and prevent photodegradation.

Example 1

A masterbatch composition containing 30-50 wt % epoxy monomer, 5-25 wt % polyfunctional (meth)acrylate monomer, 30-50 wt % space-filling monomer, 0.5-2 wt % photo-initiator, 0.5-2 wt % cationic initiator, 0.5-2 wt % co-initiator, and 0.01-2 wt % light stabilizer, was made up by mixing the components well under subdued light. Specifically, a composition containing 40.84 wt % pentaerythritol glycidyl ether, 14.90 wt % trimethyolpropane trimethacrylate, 40.84 wt % 2-phenoxyethylacrylate, 0.74 wt % 2,4,6-trimethylbenzoyl diphenyl phosphine (TPO), 0.88 wt % bis(4-methylphenyl)iodonium hexafluorophosphate, 1.33 wt % N-vinylcarbazole, and 0.47 wt % Sudan I dye is prepared. The photopolymer composition was cured using 3D-printer for testing. The characterized properties of the cured photopolymer are shown in Table 1.

TABLE 1

The properties of 3D photopolymer composition.

| Properties | Results |
| --- | --- |
| Viscosity | 70-80 cP |
| Hardness | 78 D |
| Density | 1.078 g/mL |
| Polymer density | 1.132 g/mL |
| Volume shrinkage | 4.78% |

Example 2

A masterbatch composition containing 10-40 wt % polyfunctional (meth)acrylate monomer, 30-50 wt % space-filling monomer or organic compounds, 15-35 wt % (methy) acrylate monomer, 0.5-5 wt % photo-initiator, and 0.01-1 wt % light stabilizer, was made up by mixing the components well under subdued light. Specifically, a composition containing 36.29 wt % pentaerythritol tetramethacrylate, 30.92 wt % stearyl methacrylate, 30.92 wt % 2-hydroxybutyl acrylate, 1.84 wt % 2,4,6-trimethylbenzoyl diphenyl phosphine, and 0.03 wt % Sudan I dye is prepared. The photopolymer composition was cured using 3D-printer for testing. The test results are shown in Table 2.

TABLE 2

The properties of 3D photopolymer composition.

| Properties | Results |
| --- | --- |
| Viscosity | 70-80 cP |
| Hardness | 70 D |
| Density | 1.091 g/mL |
| Polymer density | 1.193 g/mL |
| Volume shrinkage | 8.54% |
| Ash content | 0.098% |

Example 3

A masterbatch composition containing 20-40 wt % polyfunctional (meth)acrylate monomer, 20-40 wt % space-filling monomer or organic compounds, 20-40 wt % (methy) acrylate monomer, 0.5-5 wt % photo-intiator, and 0.01-1 wt % light stabilizer, was made up by mixing the components well under subdued light. Specifically, a composition containing 33.09 wt % trimethyolpropane trimethacrylate, 33.09 wt % stearyl methacrylate, 33.09 wt % isobornyl acrylate, 0.57 wt % 2,4,6-trimethylbenzoyl diphenyl phosphine, and 0.16 wt % 2,2'-(2,5-thiophenediyl)bis(5-tert-butylbenzoxazole). The photopolymer composition was cured using 3D-printer for testing. The test results are shown in Table. 3.

TABLE 3

The properties of 3D photopolymer composition.

| Properties | Results |
| --- | --- |
| Viscosity | 220 cP |
| Hardness | 90 D |
| Density | 1.095 g/mL |
| Polymer density | 1.170 g/mL |
| Volume shrinkage | 6.42% |
| Ash content | 0.06% |

Example 4

A masterbatch composition containing 75-95 wt % epoxy monomer, 0.1-15 wt % polyfunctional (meth)acrylate monomer, 0.1-10 wt % space-filling monomer, 0.5-2 wt % photo-initiator, 0.5-2 wt % cationic initiator, 1-5 wt % co-initiator, and 0.01-2 wt % light stabilizer, was made up by mixing the components well under subdued light. Specifically, a composition containing 91.90 wt % pentaerythritol glycidyl ether, 1.00 wt % trimethyolpropane trimethacrylate, 1.00 wt % 2-phenoxyethylacrylate, 0.99 wt % 2,4,6-trimethylbenzoyl diphenyl phosphine, 1.98 wt % bis(4-methylphenyl) iodonium hexafluorophosphate, 3.10 wt % N-vinylcarbazole, and 0.03 wt % Sudan I dye. The photopolymer composition was cured using 3D-printer for testing. The characterized properties of the cured photopolymer are shown in Table 4.

TABLE 4

The properties of 3D photopolymer composition.

| Properties | Results |
| --- | --- |
| Hardness | 65 D |
| Density | 1.147 g/mL |
| Polymer density | 1.191 g/mL |
| Volume shrinkage | 3.74% |

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A photopolymer composition that produces 3D printed objects, the photopolymer composition comprising:
   at least one polyfunctional (meth)acrylate monomer;
   at least one space-filling monomer or organic compounds;
   at least one (meth)acrylate monomer;
   at least one photo-initiator; and
   at least one light stabilizer,
   wherein the at least one light stabilizer controls a cure depth of the 3D printed objects having a low ash content, prevents photodegradation, and is selected from a group consisting of Sudan dyes, 2-(2'-hydroxy-3',5'-di-tert-butylphenyl)-5-chlorobenzortriazole, 2-(2'-hydroxy-3'-tert-butyl-5'-methylphenyl)-5-chlorobenzortriazole, 2,2'-(2,5-thiophenediyl)bis(5-tert-butylbenzoxazole) and (2,5-bis(5-tert-butyl-benzoxazol-2-yl)thiophene.

2. The photopolymer composition of claim 1, wherein the polyfunctional (meth)acrylate monomer is UV/visible curable, and is selected from a group consisting of ethylene glycol dimethacrylate, diethylene glycol dimethacrylate, 1,6-hexanediol dimethacyrlate, trimethyolpropane trimethacrylate, trimethyolpropane triacrylate, ethoxylated trimethylol propane trimethacrylate, ethyoxylated pentaerythritol tetramethacrylate, pentaerythritol tetramethacrylate, ethoxylated trimethylolpropane triacrylate, and pentaerythritol tetraacrylate.

3. The photopolymer composition of claim 1, wherein the space-filling monomer or organic compounds has low melting point and comprises one functional group selected from a group consisting of polyoxyethylene (40) stearate, 1-hexadecanol, 1-pentadecanol, 1-octadecanol, 1-tetradecanol, bisphenol A glycerolate dimethacrylate, stearyl methacrylate and octadecyl acrylate.

4. The photopolymer composition of claim 1, wherein the (meth)acrylate monomer serves to adjust viscosity and increase the solubility of space-filling monomer, and is selected from a group consisting of isobornyl acrylate, 2-hydroxyethyl acrylate, 4-hydroxybutyl acrylate, 2-hydroxybutyl acrylate, and 2-hydroxyethyl methacrylate.

5. The photopolymer composition of claim 1, wherein the photo-initiator generates radicals by UV/Visible light to initiate polymerization, and is selected from a group consisting of bis(2,4,6-trimethyl benzoyl)phenyl phosphine oxide and 2,4,6-trimethylbenzoyl diphenyl phosphine oxide.

6. The photopolymer composition of claim 1, wherein the photopolymer composition comprises 10-40 wt % polyfunctional (meth)acrylate monomer, 30-50 wt % space-filling monomer or organic compounds, 15-35 wt % (methy) acrylate monomer, 0.5-5 wt % photo-initiator, and 0.01-1 wt % light stabilizer.

7. The photopolymer composition of claim 6, wherein the photopolymer composition comprises 36.29 wt % pentaerythritol tetramethacrylate, 30.92 wt % stearyl methacrylate, 30.92 wt % 2-hydroxybutyl acrylate, 1.84 wt % 2,4,6-trimethylbenzoyl diphenyl phosphine, and 0.03 wt % Sudan I dye.

8. The photopolymer composition of claim 1, wherein the photopolymer composition comprises 20-40 wt % polyfunctional (meth)acrylate monomer, 20-40 wt % space-filling monomer or organic compounds, 20-40 wt % (methy) acrylate monomer, 0.5-5 wt % photo-initiator, and 0.01-1 wt % light stabilizer.

9. The photopolymer composition of claim 8, wherein the photopolymer composition comprises 33.09 wt % trimethyolpropane trimethacrylate, 33.09 wt % stearyl methacrylate, 33.09 wt % isobornyl acrylate, 0.57 wt % 2,4,6-trimethylbenzoyl diphenyl phosphine, and 0.16 wt % 2,2'-(2,5-thiophenediyl)bis(5-tert-butylbenzoxazole).

10. A photopolymer composition that produces 3D printed objects, the photopolymer composition comprising:
   at least one polyfunctional (meth)acrylate monomer;
   at least one space-filling monomer or organic compounds;

at least one (meth)acrylate monomer;
at least one photo-initiator; and
at least one light stabilizer that is selected from a group consisting of Sudan dyes, 2-(2'-hydroxy-3',5'-di-tert-butylphenyl)-5-chlorobenzortriazole, 2-(2'-hydroxy-3'-tert-butyl-5'-methylphenyl)-5-chlorobenzortriazole, 2,2'-(2,5-thiophenediyl)bis(5-tert-butylbenzoxazole) and (2,5-bis(5-tert-butyl-benzoxazol-2-yl)thiophene.

11. The photopolymer composition of claim 10, wherein the polyfunctional (meth)acrylate monomer is pentaerythritol tetramethacrylate; the space-filling monomer or organic compound is stearyl methacrylate; the (meth)acrylate monomer is 2-hydroxybutyl acrylate; the photo-initiator is 2,4,6-trimethylbenzoyl diphenyl phosphine; and the light stabilizer is Sudan I dye.

12. The photopolymer composition of claim 11, wherein the photopolymer composition comprises 36.29 wt % pentaerythritol tetramethacrylate, 30.92 wt % stearyl methacrylate, 30.92 wt % 2-hydroxybutyl acrylate, 1.84 wt % 2,4,6-trimethylbenzoyl diphenyl phosphine, and 0.03 wt % Sudan I dye.

13. The photopolymer composition of claim 10, wherein the polyfunctional (meth)acrylate monomer is trimethyolpropane trimethacrylate; the space-filling monomer or organic compound is stearyl methacrylate; the (meth)acrylate monomer is isobornyl acrylate; the photo-initiator is 2,4,6-trimethylbenzoyl diphenyl phosphine; and the light stabilizer is 2,2'-(2,5-thiophenediyl)bis(5-tert-butylbenzoxazole).

14. The photopolymer composition of claim 13, wherein the photopolymer composition comprises 33.09 wt % trimethyolpropane trimethacrylate, 33.09 wt % stearyl methacrylate, 33.09 wt % isobornyl acrylate, 0.57 wt % 2,4,6-trimethylbenzoyl diphenyl phosphine, and 0.16 wt % 2,2'-(2,5-thiophenediyl)bis(5-tert-butylbenzoxazole).

15. A photopolymer composition that produces 3D printed objects, the photopolymer composition comprising:
at least one polyfunctional (meth)acrylate monomer;
at least one space-filling monomer or organic compounds;
at least one (meth)acrylate monomer;
at least one photo-initiator; and
at least one light stabilizer,
wherein the photopolymer composition produces the 3D printed objects that have a low ash content with an ash content at 600° C. of less than 0.1%.

16. The photopolymer composition of claim 15, wherein the polyfunctional (meth)acrylate monomer is pentaerythritol tetramethacrylate; the space-filling monomer or organic compound is stearyl methacrylate; the (meth)acrylate monomer is 2-hydroxybutyl acrylate; the photo-initiator is 2,4,6-trimethylbenzoyl diphenyl phosphine; and the light stabilizer is Sudan I dye.

17. The photopolymer composition of claim 16, wherein the photopolymer composition comprises 36.29 wt % pentaerythritol tetramethacrylate, 30.92 wt % stearyl methacrylate, 30.92 wt % 2-hydroxybutyl acrylate, 1.84 wt % 2,4,6-trimethylbenzoyl diphenyl phosphine, and 0.03 wt % Sudan I dye.

18. The photopolymer composition of claim 15, wherein the polyfunctional (meth)acrylate monomer is trimethyolpropane trimethacrylate; the space-filling monomer or organic compound is stearyl methacrylate; the (meth)acrylate monomer is isobornyl acrylate; the photo-initiator is 2,4,6-trimethylbenzoyl diphenyl phosphine; and the light stabilizer is 2,2'-(2,5-thiophenediyl)bis(5-tert-butylbenzoxazole).

19. The photopolymer composition of claim 18, wherein the photopolymer composition comprises 33.09 wt % trimethyolpropane trimethacrylate, 33.09 wt % stearyl methacrylate, 33.09 wt % isobornyl acrylate, 0.57 wt % 2,4,6-trimethylbenzoyl diphenyl phosphine, and 0.16 wt % 2,2'-(2,5-thiophenediyl)bis(5-tert-butylbenzoxazole).

* * * * *